(12) United States Patent
Goodwin, III et al.

(10) Patent No.: US 7,130,889 B2
(45) Date of Patent: Oct. 31, 2006

(54) METHOD OF PRINTING INFORMATION BY A NETWORK KIOSK

(75) Inventors: John C. Goodwin, III, Suwanee, GA (US); John Brian Francis, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 969 days.

(21) Appl. No.: 09/727,335

(22) Filed: Nov. 29, 2000

(65) Prior Publication Data

US 2002/0099791 A1 Jul. 25, 2002

(51) Int. Cl.
G06F 15/16 (2006.01)

(52) U.S. Cl. ...................................... 709/218; 709/220

(58) Field of Classification Search ................ 709/218, 709/219, 203, 206, 217, 201, 223, 220, 224; 705/5, 26, 2, 14; 707/9, 104, 10, 100, 7, 707/1; 710/5; 715/523, 503, 744, 513, 16, 715/17; 358/1.15, 488; 717/100, 121; 382/306, 382/283; 463/42; 235/472; 700/235; 345/473; 101/483; 455/509
See application file for complete search history.

(56) References Cited

U.S. PATENT DOCUMENTS

| | | | | |
|---|---|---|---|---|
| 5,457,636 A * | 10/1995 | Sansone et al. | ............ | 700/235 |
| 5,950,173 A * | 9/1999 | Perkowski | ................. | 705/26 |
| 6,006,281 A * | 12/1999 | Edmunds | .................. | 710/1 |
| 6,012,102 A * | 1/2000 | Shachar | ................... | 710/5 |
| 6,029,182 A * | 2/2000 | Nehab et al. | ............. | 715/523 |
| 6,078,928 A * | 6/2000 | Schnase et al. | .......... | 707/104.1 |
| 6,094,644 A * | 7/2000 | Hillson et al. | ............ | 705/400 |
| 6,195,694 B1 * | 2/2001 | Chen et al. | .............. | 709/220 |
| 6,247,011 B1 * | 6/2001 | Jecha et al. | ............. | 707/9 |
| 6,256,773 B1 * | 7/2001 | Bowman-Amuah | ........ | 717/121 |
| 6,311,214 B1 * | 10/2001 | Rhoads | .................. | 709/217 |
| 6,354,212 B1 * | 3/2002 | Krinsky | ................... | 101/483 |
| 6,381,577 B1 * | 4/2002 | Brown | ..................... | 705/2 |
| 6,401,074 B1 * | 6/2002 | Sleeper | .................. | 705/14 |
| 6,427,032 B1 * | 7/2002 | Irons et al. | .............. | 382/306 |
| 6,438,515 B1 * | 8/2002 | Crawford et al. | ......... | 704/5 |
| 6,446,045 B1 * | 9/2002 | Stone et al. | .............. | 705/26 |
| 6,477,567 B1 * | 11/2002 | Ohara | ..................... | 709/223 |
| 6,512,521 B1 * | 1/2003 | Era | ........................ | 345/473 |
| 6,535,294 B1 * | 3/2003 | Arledge et al. | ........... | 358/1.15 |
| 6,560,621 B1 * | 5/2003 | Barile | ..................... | 715/513 |
| 6,587,596 B1 * | 7/2003 | Haeberli | ................. | 382/283 |
| 6,608,697 B1 * | 8/2003 | Schorr et al. | ............ | 358/1.15 |
| 6,613,098 B1 * | 9/2003 | Sorge et al. | .............. | 715/503 |
| 6,622,919 B1 * | 9/2003 | Wilz et al. | ............ | 235/472.01 |
| 6,623,527 B1 * | 9/2003 | Hamzy | .................... | 715/513 |
| 6,628,415 B1 * | 9/2003 | Lawrence et al. | ......... | 358/1.15 |
| 6,631,512 B1 * | 10/2003 | Onyeabor | ................. | 717/100 |

(Continued)

OTHER PUBLICATIONS

Image Production for the Web ; www.sgi.com/grafica/mostools/index.html.*

(Continued)

*Primary Examiner*—Thong Vu
(74) *Attorney, Agent, or Firm*—Paul W. Martin

(57) ABSTRACT

A method of printing information by a network kiosk which prints web page information, designed for printing on standard width paper, on narrower receipt paper. The method includes the steps of receiving a command to print information in a displayed web page, obtaining an address of the displayed web page, determining a format for printing the information on receipt paper using the address, creating a script to print the information in the format, and executing the script to print the information on the receipt paper.

8 Claims, 4 Drawing Sheets

U.S. PATENT DOCUMENTS

| | | | |
|---|---|---|---|
| 6,650,433 B1* | 11/2003 | Keane et al. ............... | 358/1.15 |
| 6,674,923 B1* | 1/2004 | Shih et al. .................. | 382/305 |
| 6,732,152 B1* | 5/2004 | Lockhart et al. ............ | 709/206 |
| 6,745,186 B1* | 6/2004 | Testa et al. ..................... | 707/7 |
| 6,754,660 B1* | 6/2004 | MacPhail ..................... | 707/100 |
| 6,757,683 B1* | 6/2004 | Goodwin et al. ............. | 707/10 |
| 6,791,723 B1* | 9/2004 | Vallmajo et al. ............. | 358/488 |
| 6,832,353 B1* | 12/2004 | Itavaara et al. ............. | 715/744 |
| 6,859,832 B1* | 2/2005 | Gecht et al. ................. | 709/224 |
| 6,976,032 B1* | 12/2005 | Hull et al. ................ | 707/104.1 |
| 6,982,733 B1* | 1/2006 | McNally et al. ............ | 715/810 |
| 6,983,415 B1* | 1/2006 | Shima ...................... | 715/501.1 |
| 2001/0011229 A1* | 8/2001 | Anderson et al. .............. | 705/14 |
| 2001/0036835 A1* | 11/2001 | Leedom ...................... | 455/509 |
| 2001/0044747 A1* | 11/2001 | Ramachandaran et al. .... | 705/16 |
| 2002/0046122 A1* | 4/2002 | Barber et al. ................. | 705/17 |
| 2002/0049535 A1* | 4/2002 | Rigo et al. ................... | 701/211 |
| 2002/0051200 A1* | 5/2002 | Chang et al. ............... | 358/1.15 |
| 2002/0055984 A1* | 5/2002 | Chang et al. ............... | 709/217 |
| 2002/0059415 A1* | 5/2002 | Chang et al. ............... | 709/223 |
| 2002/0065808 A1* | 5/2002 | Yu ................................ | 707/1 |
| 2002/0083121 A1* | 6/2002 | Chang et al. ............... | 709/201 |

OTHER PUBLICATIONS cs491notes ; cs.selu.edu/~jhu/cs335perla.html.*

COEN175—Compilers Class, Fall 1998—HW7 ; www.cse.scu.edu/~lseiter/coen175/hw/hw7.html.*

A Networked Multimedia Retrieval Management System for . . . —Holfelder, Hehmann (1994) ; www.informatik.uni-mannheim.de/informatik/pi4/publications/library/Holfelder1994a.ps.gz.*

Getting It Across: Layout Issues for Kiosk Systems—Borchers, Deussen, Knörzer (1995) ; www.tk.uni-linz.ac.at/~jan/publications/kiosk/www95-paper.ps.gz.*

Speech Recognition for an Information Kiosk—Gauvain, Gangolf, Lamel (1996) ; tlp.limsi.fr/public/icslp96maskreco.ps.Z.*

Berghel et al, Protection ownership rights through digital watermarking, Internet kiosk, Jul. 1996, pp. 101-103.*

Interacting with Paper on the DigitalDesk—Wellner (1993) ftp.parc.xerox.com/pub/europarc/reports/ddesk-cacm93.ps.Z.*

Authors' Instructions for the Preparation of Contributions to . . . —Dr Lu Qin (2000) www.cintec.cuhk.edu.hk/~iral2000/format.pdf.*

Visualizing the World-Wide Web with the Navigational View . . . —Mukherjea, Foley (1995) ftp.cc.gatech.edu/pub/groups/gvu/tr/95-09.ps.Z.*

A Spoken Language System For Information Retrieval—Bennacef, Bonneau-Maynard . . . tlp.limsi.fr/public/icslp94latis.ps.Z.*

Agents, Services, and Electronic Markets: How do they Integrate?—Merz, Lamersdorf (1996) avs-www.informatik.uni-hamburg.de/papers/ps/icsp96/icdp96.ps.gz.*

A Certified E-Mail Protocol—Schneier, Riordan (1998) www.counterpane.com/certified-email.pdf.*

Agent Based Disseminiation of Commercial Electronic . . . —Dimitri Konstantas . . . www.ktsi.com/carlos/papers/99/dimitriAgentDiss.pdf.*

An autonomous agent-based infrastructure for inter-LAN systems management Shyh-Horng Jou; Shang-Juh Kao; Autonomous Decentralized Systems, 1997. Proceedings. ISADS 97., Third International Symposium on Apr. 9-11, 1997 pp. 369-376.*

A time-stamp based solution for collective resource acquisition in a distributed system Qiang Sun; Hao Zhang; Jianhui Zhang; System Sciences, 2000. Proceedings of the 33rd Annual Hawaii International Conference on Jan. 4-7, 2000 pp. 10 pp. vol. 2.*

Measurements and models of radio frequency impulsive noise for indoor wireless communications Blackard, K.L.; Rappaport, T.S.; Bostian, C.W.; Selected Areas in Communications, IEEE Journal on vol. 11, Issue 7, Sep. 1993 pp. 991-1001.*

* cited by examiner

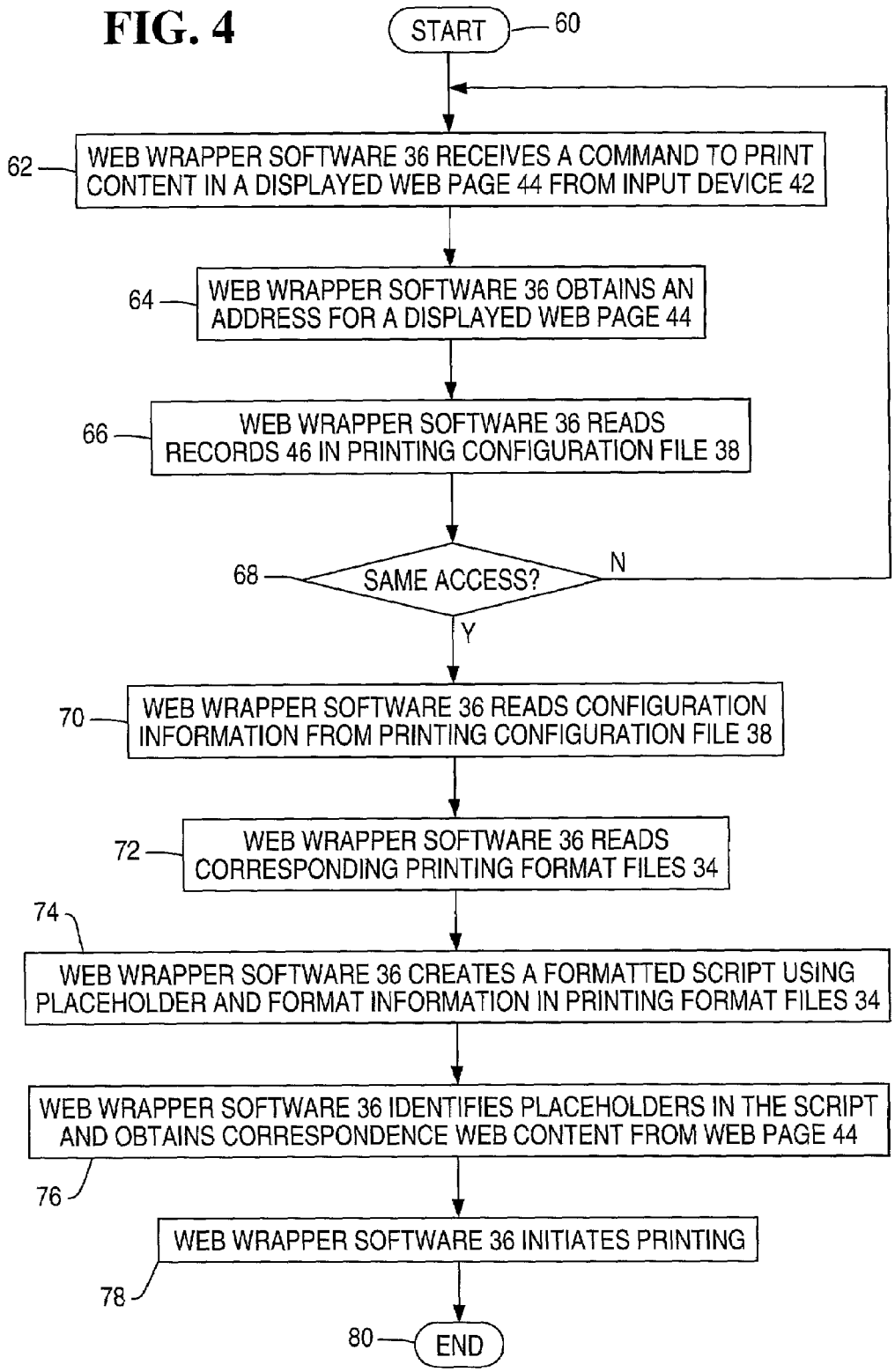

METHOD OF PRINTING INFORMATION BY A NETWORK KIOSK

BACKGROUND OF THE INVENTION

The present invention relates to self-service kiosks and more specifically to a method of printing information by a network kiosk.

Retailers have a desire to sell their products over networks, such as global networks which are a part of the World Wide Web (WWW or "web") and which use the Transmission Control Protocol/Internet Protocol (TCP/IP protocol). These retailers wish to provide Internet server web sites which offer the same features as Internet server web sites available to home shoppers who use their computers to connect to the Internet server web sites.

Kiosks provide a publicly-accessible computing platform for displaying web pages from retailer web sites. Kiosks may be located within a retailer's transaction establishment or elsewhere, such as in shopping malls. Kiosks may be easily networked to retailer web sites using the TCP/IP protocol. Web pages from web sites may be displayed using known and available web software, such as Microsoft® Internet Explorer software.

Printing of information displayed by a web browser software application is difficult on a kiosk. Kiosks typically include receipt printers or printers which take paper smaller than standard 8½"×11" paper. Web pages containing transaction information are not formatted to print on smaller-size paper.

Therefore, it would be desirable to provide a method of printing web page transaction information onto receipt paper.

SUMMARY OF THE INVENTION

In accordance with the teachings of the present invention, a method of printing information by a network kiosk is provided.

The method includes the steps of receiving a command to print information in a displayed web page, obtaining an address of the displayed web page, determining a format for printing the information on receipt paper using the address, creating a script to print the information in the format, and executing the script to print the information on the receipt paper.

It is accordingly an object of the present invention to provide a method of printing information by a network kiosk.

It is another object of the present invention to determine how much content of each web page is to be printed and how the determined content is to be printed on receipt paper.

It is another object of the present invention to print other information, such as text and graphics, with web information on receipt paper.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a flow diagram illustrating the printing method of the present invention.

DETAILED DESCRIPTION OF THE PREFERRED EMBODIMENT

Figure 1:
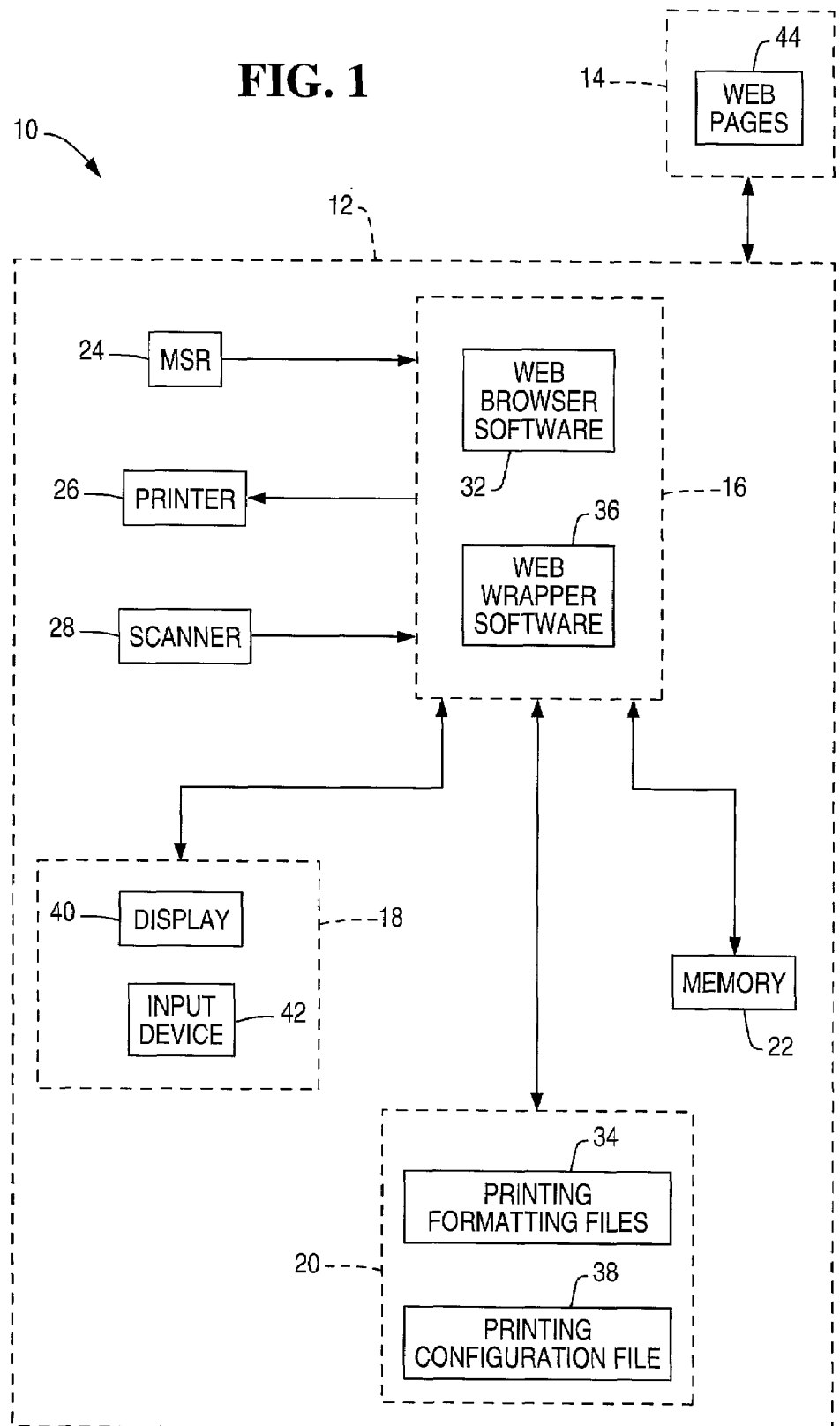
FIG. 1 is a block diagram of a transaction processing system including a network kiosk.
Figure 2:
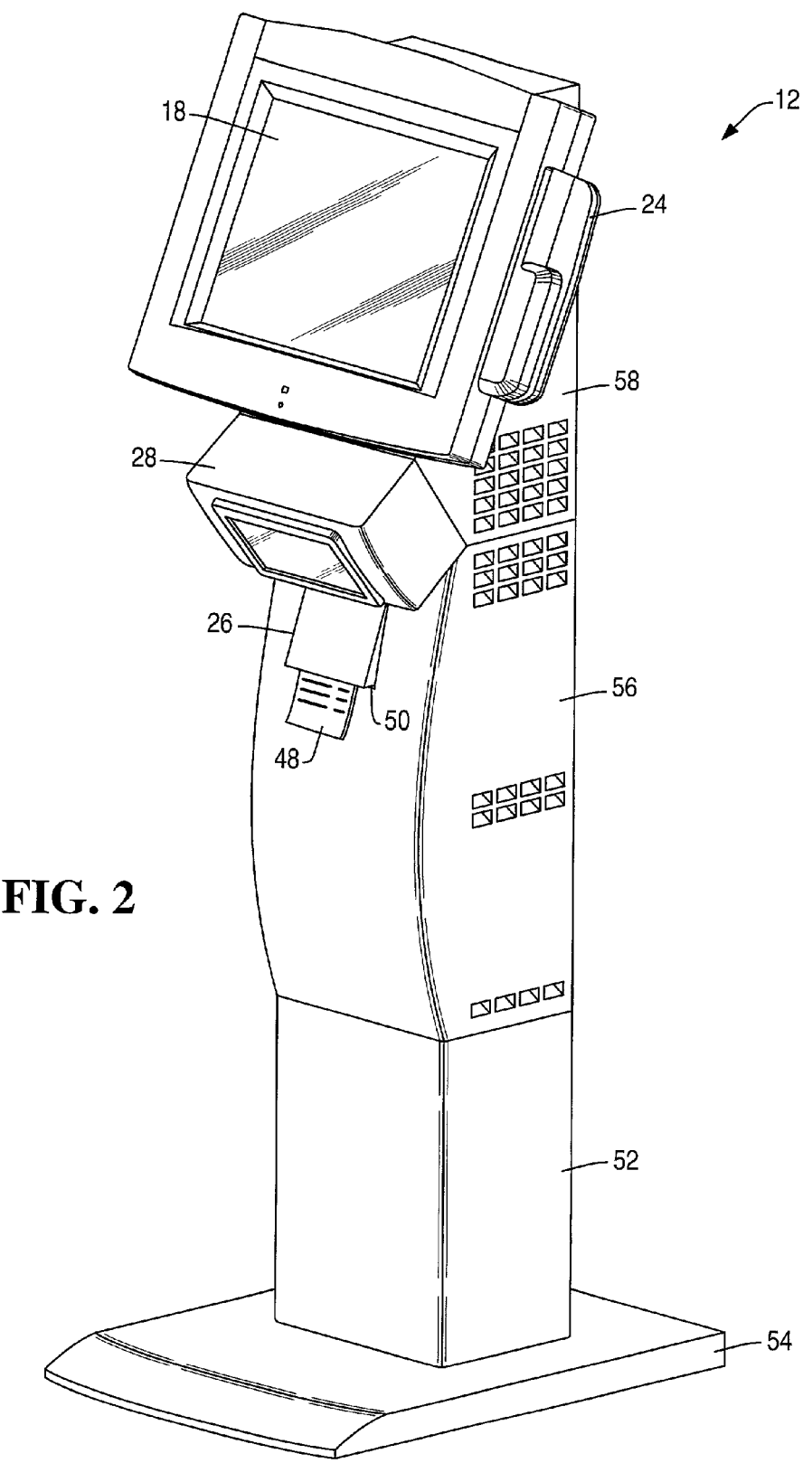
FIG. 2 is a perspective view of a kiosk.

Turning now to FIGS. 1 and 2, transaction system 10 includes kiosk 12 and network 14. Kiosk 12 is preferably located within a transaction establishment, such as a retail store, or transaction environment, such as a shopping mall. Kiosk 12 may include an NCR 7401 computer.

Kiosk 12 primarily includes processor 16, touch screen 18, memory 20, and storage medium 22. Kiosk 12 may additionally include a number of peripherals, including magnetic strip reader (MSR) 24, printer 26, and scanner 28.

To assist with execution of certain tasks performed by kiosk 12, kiosk 12 includes a built-in time keeping device, commonly referred to as a system clock, which is synchronized with current time, in order to automatically execute the tasks at their scheduled times.

Processor 16 controls operation of kiosk 12 and executes web browser software 32 and web wrapper software 36.

Web browser software 32 allows an operator to access information and purchase products from retailers through network 14, which preferably includes World Wide Web (WWW or "web") servers. Web browser software 32 may include commercially-available web browser software, such as Microsoft® Internet Explorer web browser software. Microsoft® Internet Explorer web browser software is configured into a kiosk operation using a "-k" command line option. This option hides toolbars and menubars to prevent operator access to those functions.

Web browser software 32 retrieves and displays web pages 44 from network 14, which includes a plurality of interconnected servers. Web pages 44 include web pages which display information about products and services offered by the kiosk owner as well as other web pages. Web pages 44 assist operators to find information about products sold by the kiosk owner and to complete purchases of such products. For this purpose, web pages 34 may include a start or "home" page which operates as a default page from which operation begins and to which operation returns when an operator is finished using kiosk 12. Web pages 44 may be written using hypertext markup language (HTML) or other suitable web page language.

Web wrapper software 36 provides security functions. During operation, web wrapper software 36 prevents an operator from accessing kiosk files, other applications, the operating system software, or basic input-output system (BIOS) firmware, and prevents the operator from causing kiosk 12 to reboot.

Under the present invention, web wrapper software 36 additionally controls printing of web page information by printer 26. Specifically, web wrapper software 36 determines how much content of each web page 44 is to be printed and how the determined content is to be printed on receipt paper 48.

Pages containing printable content and configuration settings to assist in printing may be coded into web wrapper software 36 or listed in printing configuration file 38 to allow a kiosk owner to control operation. Content and format for the content may be coded into web wrapper software 36 or listed in one or more printing format files 34 to allow a kiosk owner to control operation.

The characteristics of receipt paper 48 could be hard-coded into web wrapper software 36, instead of using configuration files 34 and 38. However, use of such files 34 and 38 allows content and formatting of receipts 48 to be easily changed. Also, the number of files 34 and 38 may be one or a number of files.

Touch screen 18 includes display 40 and input device 42. Display 40 and input device 42 may also be separate units. Input device 42 may record personal information from an operator.

Memory 20 is used by processor 16 to store executed program information, including web wrapper software information.

Storage medium 22 stores software including web wrapper software 36. Storage medium 22 also stores display content 34 and display configuration file 38.

MSR 24 reads loyalty, credit, debit, SMART, and/or other types of cards carried by an operator. MSR 24 may record personal information from an operator.

Printer 26 prints information from web wrapper software 32, including information from web pages 44 from network 14. For example, printer 26 may print information relevant to a transaction completed by an operator using kiosk 12. Printer 26 uses paper 48 narrower than standard 8½"×11" paper. Also, paper 48 includes paper rolls instead of paper sheets.

Scanner 28 reads bar codes on products to obtain product identification numbers. Kiosk 12 queries a transaction server with the identification numbers to obtain information about the product and displays the information.

With reference to FIG. 2, an example of kiosk 12 is shown. Kiosk 12 is constructed as a pedestal, with bottom support pieces 52 and 54, printer assembly 56, and top support piece 58. Other mounting arrangements are also envisioned.

Printer assembly 56 includes aperture 50 through which paper 48 passes. Paper 48 for this example of kiosk 12 and printer 26 is about 3.25 inches to 4.5 inches wide. Paper 48 is also preferably a paper roll, and may be used to print content from web pages 44, receipts, shopping lists, and other information that kiosk 12 provides.

Figure 3:
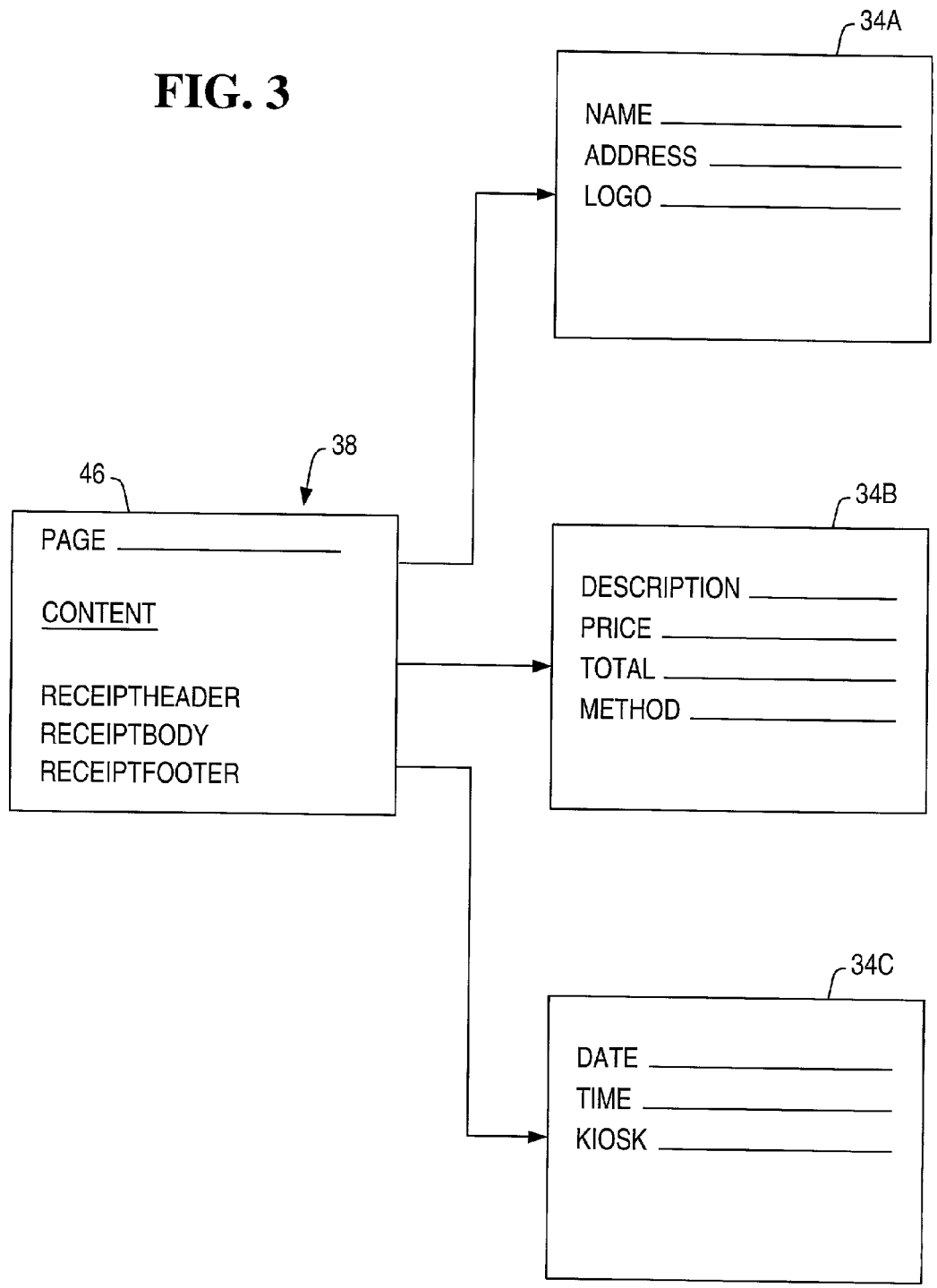
FIG. 3 is a depiction of a printing configuration file.

Turning now to FIG. 3, printing format files 34 and printing configuration file 38 are illustrated.

Printing configuration file 38 includes record 46 for each web page 44. Each record includes entries PAGE and CONFIGURATION.

Entry PAGE identifies a particular web page 44.

Entry CONFIGURATION identifies configuration information to assist in printing of web page content by web wrapper software 36.

Printing format files 34 include a header configuration file 34A, a footer configuration file 34C, and a body configuration file 34C.

Header configuration file 34A includes entries for store NAME, store ADDRESS, and store LOGO.

Entry NAME identifies a store name.

Entry ADDRESS identifies a store address.

Entry LOGO identifies a store logo or graphic.

All receipts will use this header information, thus, it can be printed as standard.

Body configuration file 34B includes entries for DESCRIPTION, PRICE, TOTAL, and METHOD.

Entry DESCRIPTION identifies an item in a transaction.

Entry PRICE identifies a price of an item.

Entry TOTAL identifies a total price.

Entry METHOD identifies a payment method, typically a credit card type or check.

Footer configuration file 34C includes entries for DATE, TIME, and KIOSK.

Entry DATE identifies a date of a transaction.

Entry TIME identifies a time of a transaction.

Entry KIOSK identifies a particular kiosk.

A formatted script may contain text and graphic web content. A formatted script in the form of a sample receipt is illustrated below with key identifiers or placeholders:

```
                    ON-LINE MART
                   2651 Satellite Blvd.
                    Duluth, GA 30096
        %Desc            %Price           <Repeat>
        Total                              %TotalAmt
        %MethodPayment
                      Thank You
                   For Shopping With Us
        Date:   %D      Time:   %T       TID:    %K
``` where % D is a placeholder for entry DATE, % T is a placeholder for entry TIME, % K is a placeholder for entry KIOSK, % Desc is a placeholder for entry DESCRIPTION, % Price is a placeholder for entry PRICE, <Repeat> repeats the placeholders % Desc and % Price for each purchased item, % TotalAmt is a placeholder for entry TOTAL, and % MethodPayment is a placeholder for entry METHOD.

This method allows for text and placeholders to be mixed together in the same format. At actual print time, the placeholders will be replaced with the corresponding information. A corresponding printed message in the form of a printed receipt would contain text:

```
                    ON-LINE MART
                   2651 Satellite Blvd.
                    Duluth, GA 30096
        Jacket                            14.00
        Shoes                             22.00
        Total                             36.00
        Visa 4784 xxxx xxxx xxxx
                      Thank You
                   For Shopping With Us
        Date: 10/09/00    Time: 11:37 am       TID:2
```

In response to a print command, including print commands initiated by an operator, web wrapper software 36 compares an address of a displayed web page to entries PAGE in printing configuration file 38. If the address of the displayed page is located within printing configuration file 38, web wrapper software 36 enables printer 26. Web wrapper software 36 reads entries CONFIGURATION to obtain configuration information. In the example above, Web wrapper software 36 determines configuration information associated with a transaction processing web page. Such configuration information indicates that the transaction information should be printed using content and formatting identified in printing format files 34. Web wrapper software 36 creates a script by obtaining content identified in printing format files 34 and formatting it in accordance with format information in printing format files 34. Web wrapper software 36 then executes the script to print the formatted transaction information on receipt paper 48 using printer 26.

Turning now to FIG. 4, the method of the present invention is illustrated in detail beginning with START 60.

In step 62, web wrapper software 36 receives a command to print content in a displayed web page 44 from input device 42.

In step 64, web wrapper software 36 obtains an address for web page 44.

In step 66, web wrapper software 36 reads records 46 in printing configuration file 38.

In step 68, web wrapper software 36 compares PAGE entries in records 46 with the address of the displayed page. If one of the PAGE entries in records 46 is the same as the address of the displayed page, operation proceeds to step 72. Otherwise, operation ends at step 80.

In step 70, web wrapper software 36 reads configuration information from printing configuration file 38.

In step 72, web wrapper software 36 reads corresponding printing format files 34.

In step 74, web wrapper software 36 creates a formatted script using placeholder and format information in printing format files 34.

In step 76, web wrapper software 36 identifies placeholders in the script and obtains corresponding web content from web page 44.

In step 78, web wrapper software 36 initiates printing. Printer 26 prints the script with the web content.

In step 80, operation ends.

Although the present invention has been described with particular reference to certain preferred embodiments thereof, variations and modifications of the present invention can be effected within the spirit and scope of the following claims.

We claim:

1. A method of printing information by a network kiosk comprising the steps of:
    (a) receiving a command to display a web page in response to user operation of the kiosk;
    (b) receiving a command to print information in the displayed web page in response to user operation of the kiosk;
    (c) obtaining an address of the displayed web page by the kiosk;
    (d) determining a format for printing, the information from the web page on receipt paper smaller than the web page using the address by the kiosk;
    (e) creating a script to print the information in the format by the kiosk; and
    (f) executing the script to cause a receipt printer of the kiosk to print the information on the receipt paper by the kiosk.

2. The method as recited in claim 1, wherein step e comprises the substeps of:
    (e-1) determining placeholders for the information; and
    (e-2) arranging the placeholders in the script in accordance with the format.

3. The method as recited in claim 2, wherein step e further comprises the substeps of:
    (e-3) determining text to be printed with the information; and
    (e-4) arranging the text in the script in accordance with the format.

4. The method as recited in claim 2, wherein step e further comprises the substeps of:
    (e-3) determining a graphic image to be printed with the information; and
    (e-4) arranging the graphic image in the script in accordance with the format.

5. A method of printing information by a network kiosk comprising the steps of:
    (a) receiving a command to display a web page in response to user operation of the kiosk;
    (b) receiving a command to print web information in the displayed web page in response to user operation of the kiosk;
    (c) obtaining an address of the displayed web page by the kiosk;
    (d) determining a format for printing the web information from the displayed web page on receipt paper smaller than the displayed web page using the address by the kiosk;
    (e) determining other information to be printed with the web information by the kiosk;
    (f) determining placeholders for the web information by the kiosk;
    (g) creating a script with the placeholders and the other information arranged in the format by the kiosk; and
    (h) executing the script to cause a receipt printer of the kiosk to print the web information and the other information on the receipt paper by the kiosk.

6. A method of printing information by a network kiosk comprising the steps of:
    (a) receiving a command to display a web page in response to user operation of the kiosk;
    (b) receiving a command to print web information in the displayed web page in response to user operation of the kiosk;
    (c) obtaining an address of the displayed web page by the kiosk;
    (d) determining a format for printing the web information from the displayed web page on receipt paper smaller than the displayed web page using the address by the kiosk;
    (e) determining text information to be printed with the web information by the kiosk;
    (f) determining a store graphic to be printed with the web information by the kiosk;
    (g) determining placeholders pointing to a location of the web information by the kiosk;
    (h) creating a script with.the placeholders, the text information, and the store graphic, all arranged in the format by the kiosk;
    (i) initiating execution of the script by the kiosk;
    (j) printing the text information and the store graphic in the format during execution of the script by a receipt printer of the kiosk;
    (k) obtaining the web information from the location during execution of the script by the kiosk; and
    (l) printing the web information in the format during execution of the script by the receipt printer of the kiosk.

7. A network kiosk comprising:
a display for displaying a web page;
a receipt printer; and
a computer which receives a command to display the web page in response to user operation of the kiosk, receives a command to print information in the web page in response to user operation of the kiosk, obtains an address of the web page, determines a format for printing the information on receipt paper smaller than the web page using the address, creates a script to print the information in the format, and executes the script to cause the receipt printer to print the information on the receipt paper.

8. A network kiosk comprising:
a display for displaying a web page;
a receipt printer; and
a computer which receives a command to display the web page in response to user operation of the kiosk, receives a command to print web information in the displayed web page in response to user operation of the kiosk, obtains an address of the displayed web page, determines a format for printing the web information on receipt paper smaller than the web page using the address, determining other information to be printed with the web information, determines placeholders for the web information, creates a script with the placeholders and the other information arranged in the format, and executes the script to cause the receipt printer to print the web information and the other information on the receipt paper.

* * * * *